S. SCHOPFLOCHER.
WINDOW OR THE LIKE FOR MOVING VEHICLES.
APPLICATION FILED APR. 14, 1919.

1,333,508.   Patented Mar. 9, 1920.

Inventor
Siegfried Schopflocher

By William Clinton
Attorney

UNITED STATES PATENT OFFICE.

SIEGFRIED SCHOPFLOCHER, OF MONTREAL, QUEBEC, CANADA, ASSIGNOR OF ONE-HALF TO CLARK E. CARTER, OF MONTREAL, QUEBEC, CANADA.

WINDOW OR THE LIKE FOR MOVING VEHICLES.

1,333,508.  Specification of Letters Patent.  Patented Mar. 9, 1920.

Application filed April 14, 1919. Serial No. 289,994.

*To all whom it may concern:*

Be it known that I, SIEGFRIED SCHOPFLOCHER, a subject of the King of Great Britain, residing at Montreal, Province of Quebec, Canada, have invented certain new and useful Improvements in Windows or the like for Moving Vehicles; and I do hereby declare that the following is a full, clear, and exact description of the invention, such as will enable others skilled in the art to which it appertains to make and use the same.

The present invention relates to improvements in windows or the like for moving vehicles and has for its object the provision of an improved construction of this character so constructed and arranged as to localize any fractures thereof due to accidents or the like and thus prevent the flying of sharp splinters or parts and consequent injury to the occupants of the vehicle. The other objects will appear hereinafter.

The invention consists in the combination and arrangement of parts hereinafter described in the claims.

Figure 1:
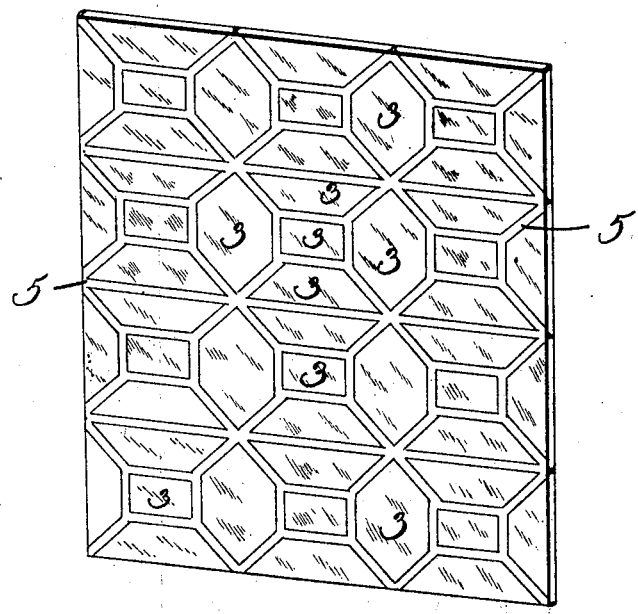
Figure 2:
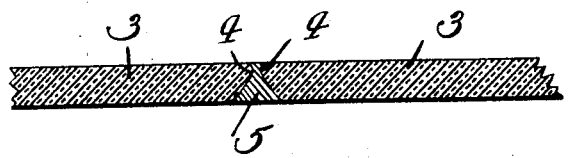

The invention is best understood by reference to the accompanying drawings forming a part of this specification, and in which, Figure 1 is a perspective view of a panel or section of a window or the like constructed in accordance with the invention; and, Fig. 2 is a section on an enlarged scale taken through a joint in said panel.

The preferred form of construction as illustrated in the drawings comprises a section or panel made up of a plurality of glass plates or pieces 3 of various forms and shapes designed and adapted to fit together edge to edge to constitute a section or panel for a window, window shield or the like of railway cars, automobiles or other moving vehicles. The adjoining edges of the plates 3 are beveled as indicated in Fig. 2 to most nearly approach along the lines or portions 4 and to flare in both directions from said lines 4. The spaces thus formed or provided between the adjoining edges of the plates 3 are filled with a binding material to form a joint 5 securely holding the plates together. In the form of the invention illustrated the binding material is of translucent material such as ordinary water glass or the like which is weaker or of less strength than the glass of which the plates 3 are formed. Thus, in case of accident, such as a collision or the like in which the glass is fractured, the fractures will be localized in the joint 5 and thus prevent the formation of glass splinters or parts having sharp cutting edges, which in flying as the result of the force of the accident are likely to cut and injure the occupants of the vehicle. The lines 4 of closest approach are preferably located adjacent the outer surfaces of the glass plate 3, thus tending further to localize any fracture taking place. When my construction as set forth is used as a wind shield for an automobile it also has a tendency to stop or mitigate the usual glare therefrom.

To further insure against injury to the occupants of the vehicles in the case of accident the edges of the glass pieces 3 are dulled by being rounded as indicated, thus destroying their capacity for cutting or injuring the skin of the occupants of the vehicle.

While I have illustrated and described the preferred form of construction for carrying out my invention these are capable of variations and modifications without departing from the spirit of the invention. I therefore do not wish to be limited to the precise form and arrangement of parts disclosed, but desire to avail myself of such variations and modifications as come within the scope of the appended claims.

Having thus fully described my invention, what I claim as new and desire to secure by Letters Patent is:

1. A window or the like for moving vehicles comprising a plurality of plates of translucent material set edge to edge, said edges being dulled; and a binding element of translucent material for securing together the adjoining edges of said plates, substantially as described.

2. A window or the like for moving vehicles comprising a plurality of plates of translucent material set edge to edge, said edges being dulled; and a binding element of translucent material for securing together the adjoining edges of said plates, said element being weaker than said plates to localize the fracture.

3. A window or the like for moving vehicles comprising a plurality of glass plates set edge to edge being beveled to approach each other at a line between the outer surfaces of said plates and flaring outwardly in both directions; and a binding element of translucent material interposed between said adjoining edges and serving to hold said plates together, said binding element being of weaker material than the plates themselves to localize the fracture, substantially as described.

4. A window or the like for moving vehicles comprising a plurality of glass plates set edge to edge being beveled to approach each other, said lines of closest approach being situated adjacent the outer surfaces of said plates; and a binding element of translucent material interposed between said adjoining edges and serving to hold said plates together, said binding element being of weaker material than the plates themselves to localize the fracture, substantially as described.

In witness whereof I have hereunto set my hand.

SIEGFRIED SCHOPFLOCHER.